No. 692,013. Patented Jan. 28, 1902.
G. E. HEYL-DIA.
INSULATING COVERING MATERIAL FOR ELECTRIC CABLES, CONDUCTORS, &c.
(Application filed Nov. 1, 1901.)
(No Model.)
FIG. 1.
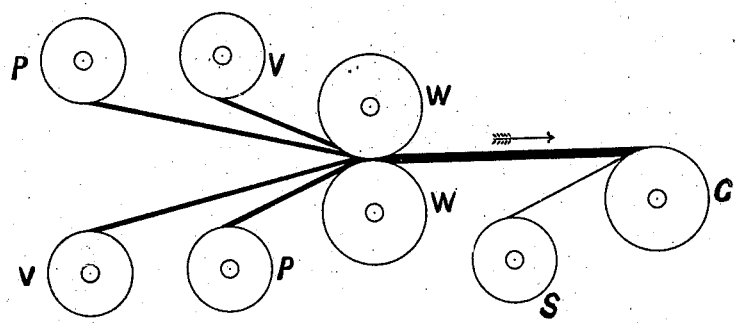
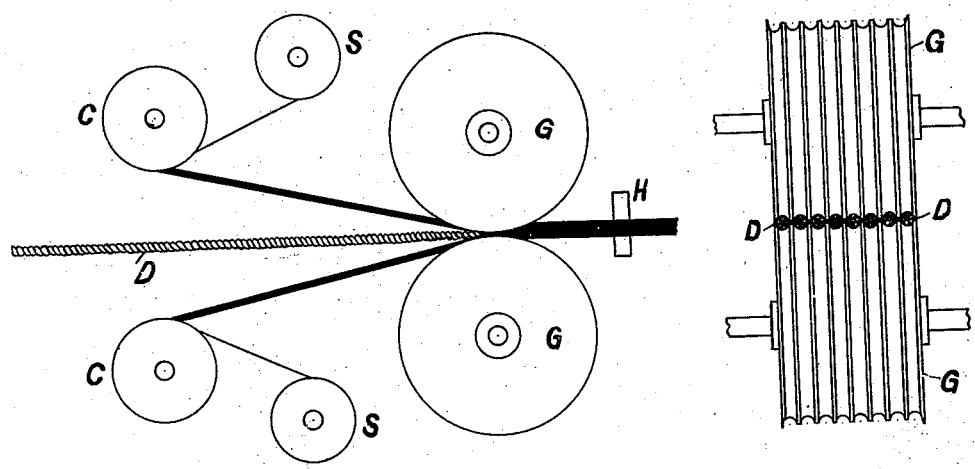
FIG. 2.   FIG. 3.
Witnesses
Peter A. Ross.
H. Alan Connett
Inventor:
George Edward Heyl-Dia
By Henry Connett
His Attorney

UNITED STATES PATENT OFFICE.

GEORGE EDWARD HEYL-DIA, OF MANCHESTER, ENGLAND.

INSULATING COVERING MATERIAL FOR ELECTRIC CABLES, CONDUCTORS, &c.

SPECIFICATION forming part of Letters Patent No. 692,013, dated January 28, 1902.

Original application filed December 17, 1900, Serial No. 40,122. Divided and this application filed November 1, 1901. Serial No. 80,752. (No specimens.)

*To all whom it may concern:*

Be it known that I, GEORGE EDWARD HEYL-DIA, electrical engineer, a subject of the King of Great Britain, residing in Manchester, in the county of Lancaster, England, (whose post-office address is Birk Crag, 236 Great Clowes street, Higher Broughton, Manchester,) have invented certain new and useful Improvements in Insulating Covering Material for Electric Cables, Conductors, or Wires, of which the following is a specification.

This invention relates to an insulating material for covering electric cables, conductors, or wires, and is designed to obviate the wrapping on of the unvulcanized-rubber strip, as at present practiced.

The insulating covering material of my invention consists of a sheet of unvulcanized rubber combined with vulcanized rubber or other suitable insulating material into a single composite sheet or strip, of which one side only consists of a sheet of unvulcanized rubber, by the method described in my patent application filed the 17th day of December, 1900, Serial No. 40,122, and was originally comprised in said application, but has been divided to form the subject of the present separate patent application.

While, as described in my aforesaid patent, the sheet of unvulcanized rubber may be combined with any suitable insulating material, it is preferable to combine it with vulcanized or vulcanizing rubber—that is to say, rubber which contains sufficient sulfur to vulcanize it—whether the heating to complete the vulcanizing process be applied after the application of the material to the conductors or at any time before such application. If such sulfur-containing rubber be selected as the insulating material, it will integrally unite with the sheet of unvulcanized rubber and produce a more effective composite strip than other insulating materials. The sheet of unvulcanizable rubber I employ consists, as usual, of rubber containing little or no sulfur, so that it will not vulcanize.

The accompanying drawings illustrate a means for carrying my invention into practice, as described in my aforesaid patent, in which—

Figure 1 is a side elevation of the device for preparing the materials, and Figs. 2 and 3 are respectively a side and front elevation of a device for applying the prepared material to the conductor.

One preferred method of coating the vulcanized rubber with the unvulcanized rubber consists as follows:

The unvulcanized rubber and the vulcanized rubber are calendered separately into separate sheets. Then the two sheets are passed between warm rollers under pressure in order to make them adhere to one another and to draw out the air from between them. The combined sheet thus made may be stored in any convenient manner. It is preferable to wind it onto a roller, with a sheet of cloth between the turns to prevent the whole from sticking together.

By my invention an improved insulating material is provided consisting of composite rubber, which is adapted to be readily applied to electric conductors.

In carrying the invention into effect the vulcanized rubber may be coated with the unvulcanized rubber by the aforesaid means or by any convenient or suitable means, and the composite rubber sheet, tape, or strip thus produced is then applied to the wire or other conductor by means of grooved pressure-rollers in the usual way or by any convenient means, the unvulcanized-rubber side being turned next to the wire. The conductor thus covered may receive another layer or several layers of the composite rubber or ordinary vulcanizing rubber by the same means and at the one operation, if desired. It may also be braided or otherwise further covered in any ordinary or known manner, as may be deemed requisite.

It will be readily understood that other suitable insulating material may be used in place of the vulcanized rubber to receive the coating of unvulcanized rubber without departing from the spirit of the invention.

I will now explain the constructions illustrated in the drawings, premising, however, that the present invention is not limited to any specific apparatus or means for carrying it out.

Referring to Fig. 1, which shows the means for producing in a convenient way the composite material, W W designate warm rollers, to which are led strips of unvulcanized rubber from drums P and vulcanized or vulcanizing rubber from drums V. These strips are alternated and superimposed and are pressed into a compound strip by the rollers W, this strip having one face of unvulcanized rubber. The composite strip is wound onto a drum or roller C, together with a separating sheet of cloth from a drum or roller S.

Referring to Figs. 2 and 3, G G are grooved rollers for applying the insulating-covering to conductors D, the sheets of the compound or composite material being drawn directly from the receiving-rollers C C, one of which is illustrated in Fig. 1. A plurality of the conductors are covered at one time and afterward cut apart by cutters H. The separating-cloth may be rewound on the roller S as the strip of insulating material is drawn from the drum C.

The heating of the covered conductors to complete the vulcanizing process if not previously done is now carried out in the usual manner.

It may be proper to explain that my insulating material when completed and ready for use and sale is a flat or sheet material and not a tube and that the sheet of unvulcanized rubber is on what I denominate the "inner" face only. This inner face is that which will be in contact with the wire or conductor when the material is applied in use.

I declare that what I claim is—

1. As an improved article of manufacture, an insulating material for electric conductors having its inner face, which is to be applied to the conductor, composed of a sheet of unvulcanized rubber and its outer face composed of another insulating material, these two substances being united integrally to form a single composite sheet or strip, substantially as set forth.

2. As an improved article of manufacture, an insulating material for electric conductors consisting of a flat sheet of substantially uniform thickness having its inner face, which is to be applied to the conductor, composed of a sheet of unvulcanized rubber, and its outer face composed of vulcanized rubber, these two substances being united integrally to form a single sheet, substantially as set forth.

In witness whereof I have hereunto signed my name, this 22d day of October, 1901, in the presence of two subscribing witnesses.

GEORGE EDWARD HEYL-DIA.

Witnesses:
CYRIL MANNING,
SIDNEY W. DOD.